United States Patent
Lv

(10) Patent No.: US 8,223,864 B2
(45) Date of Patent: Jul. 17, 2012

(54) METHOD, DEVICE AND SYSTEM FOR DETECTING RADIO FREQUENCY INTERFERENCE

(75) Inventor: Jie Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 13/013,405

(22) Filed: Jan. 25, 2011

(65) Prior Publication Data
US 2011/0122935 A1    May 26, 2011

Related U.S. Application Data

(63) Continuation of application No. PCT/CN2009/071113, filed on Mar. 31, 2009.

(30) Foreign Application Priority Data

Jul. 28, 2008  (CN) .......................... 2008 1 0142579

(51) Int. Cl.
*H04L 27/28* (2006.01)

(52) U.S. Cl. ....................................... 375/260; 375/340

(58) Field of Classification Search .................. 375/260, 375/316, 340
See application file for complete search history.

(56) References Cited

U.S. PATENT DOCUMENTS

| 7,813,701 B2* | 10/2010 | Strong et al. ................. 455/63.1 |
| 2003/0223518 A1 | 12/2003 | Shmulyian et al. |
| 2006/0126493 A1* | 6/2006 | Hashem et al. ................ 370/208 |
| 2006/0215775 A1 | 9/2006 | Lin et al. |
| 2008/0107054 A1* | 5/2008 | Parts et al. .................... 370/310 |

FOREIGN PATENT DOCUMENTS

| CN | 101019333 A | 8/2007 |
| KR | 1020040001219 A | 1/2004 |

OTHER PUBLICATIONS

International Search Report dated Jul. 9, 2009 in connection with PCT Application No. PCT/CN2009/071113.

* cited by examiner

*Primary Examiner* — Emmanuel Bayard

(57) ABSTRACT

A method for detecting radio frequency interference (RFI) is provided. The method includes the following steps. Parameters of at least two pairs of digital subscriber lines (DSLs) are acquired. Sub-carriers having RFI in each pair of the at least two pairs of DSLs are detected according to the parameters. The number of line pairs having RFI on the same sub-carrier in the DSLs is counted, and if the number of the line pairs occurring RFI on the sub-carrier is greater than a preset threshold, or if a ratio of the number of the line pairs occurring RFI on the sub-carrier to a line pair number of the at least two pairs of DSLs is greater than a preset threshold, it is determined that RFI exists at a frequency corresponding to the sub-carrier. A device and a system for detecting RFI are further provided. Therefore, RFI frequency existing in xDSL can be detected.

13 Claims, 2 Drawing Sheets

METHOD, DEVICE AND SYSTEM FOR DETECTING RADIO FREQUENCY INTERFERENCE

CROSS-REFERENCE TO RELATED APPLICATIONS

This application is a continuation of International Application No. PCT/CN2009/071113, filed on Mar. 31, 2009, which claims priority to Chinese Patent Application No. 200810142579.X, filed on Jul. 28, 2008, both of which are hereby incorporated by reference in their entireties.

TECHNICAL FIELD

The present invention relates to the filed of communication technology, and more particularly to a method, device and system for detecting radio frequency interference (RFI).

BACKGROUND

Digital subscriber line (DSL) technology is a high speed transmission technology for data transmission over telephone twist pair, that is, unshielded twist pair (UTP). The DSL technology includes asymmetrical digital subscriber line (ADSL), very-high-bit-rate digital subscriber line (VDSL), single-pair high-bit-rate digital subscriber line (SHDSL), asymmetrical digital subscriber line 2 (ADSL2), asymmetrical digital subscriber line 2plus (ADSL2plus), and very-high-bit-rate digital subscriber line 2 (VDSL2), with xDSL being a general designation for the above DSL technology.

Within the frequency range used by an xDSL, a wide range of radio frequency waves exist, these waves may be used in a broadcasting station, for radio communication, and the like. Radio frequency bands in China are specified as follows: 120-300 kHz is used for long-wave amplitude modulation broadcast; 525-1605 kHz is used for medium-wave amplitude modulation broadcast; and 3.5-29.7 MHz is used for short-wave amplitude modulation broadcast, single sideband communication, and amateur radio.

All the frequencies used by the radio services overlap more or less with the frequencies used by xDSL services. When radio waves transmitted by the radio services are coupled to an xDSL, and have the same frequency as that of some of sub-carriers of the xDSL, the transmission of the xDSL sub-carriers are affected, which causes instability of the xDSL services and generates an error or disconnection. Such radio interference is referred to as RFI.

RFI band specified by ITU-T is a measure for shielding RFI proposed by ADSL2plus and VDSL2. If the band range of RFI interference is known, the DSL sub-carriers at these frequency bands may be shielded. In this manner, RFI interference at these frequencies will not cause an error in a DSL line, or will not affect the stability of the DSL line. In addition, a DSL transceiver may also reduce transmission power at these RFI frequencies, thus avoiding the interference of the DSL services to broadcasting services.

Such technologies as RFI band only provide a method for solving RFI when the RFI frequency is known. But how to obtain the RFI frequency is not mentioned. Generally, the RFI frequency can only be acquired through operator's experience or through investigation. The method does not work if the RFI frequency is not known.

SUMMARY

The embodiments of the present invention provide a method, a device and a system for detecting RFI, which can detect RFI frequency in an xDSL.

In an embodiment, the present invention provides a method for detecting RFI. The method includes the following steps:
Parameters of at least two pairs of DSLs are acquired.
Sub-carriers having RFI in each pair of the at least two pairs of DSLs are detected according to the parameters.
The number of line pairs having RFI on the same sub-carrier in the DSLs is counted, if the number of the line pairs having RFI on the sub-carrier is greater than a preset threshold, or if a ratio of the number of the line pairs having RFI on the sub-carrier to the number of line pairs of the at least two pairs of DSLs is greater than a preset threshold, it is determined that the RFI exists at a frequency corresponding to the sub-carrier.

In an embodiment, the present invention further provides a detecting device. The detecting device includes an acquiring unit, a detecting unit, a counting unit, and a determining unit.

The acquiring unit is configured to acquire parameters of at least two pairs of DSLs. The detecting unit is configured to detect sub-carriers having RFI in each pair of the at least two pairs of DSLs according to the parameters. The counting unit is configured to count the number of line pairs having RFI on the same sub-carrier in the DSLs. The determining unit is configured to determine whether the number of line pairs counted by the counting unit is greater than a preset threshold, or whether a ratio of the number of line pairs counted by the counting unit to the number of line pairs of the at least two pairs of DSLs is greater than a preset threshold, and if so, the detecting unit determines that the RFI exists at a frequency corresponding to the sub-carrier.

In an embodiment, the present invention further provides a DSL system, which includes a first device and a second device. The first device includes an acquiring unit, a detecting unit, a counting unit, and a determining unit.

The acquiring unit is configured to acquire parameters of at least two pairs of DSLs from the second device. The detecting unit is configured to detect sub-carriers having RFI in each pair of the at least two pairs of DSLs according to the parameters. The counting unit is configured to count the number of line pairs having RFI on the same sub-carrier in the DSLs. The determining unit is configured to determined whether the number of line pairs counted by the counting unit is greater than a preset threshold, or whether a ratio of the number of line pairs counted by the counting unit to the number of line pairs of the at least two pairs of DSLs is greater than a preset threshold, and if so, the detecting unit determines that the RFI exists at a frequency corresponding to the sub-carrier.

With the method, device and system for detecting RFI provided in the embodiments of the present invention, the RFI frequency existing in an xDSL can be detected, thus solving the problem of RFI. Therefore, the problem in the prior art that the RFI existing in the xDSL cannot be solved if the RFI frequency is not known in advance, is solved.

DETAILED DESCRIPTION

The present invention provides a method, a device and a system for detecting RFI, which can detect RFI frequency existing in an xDSL.

Figure 1:
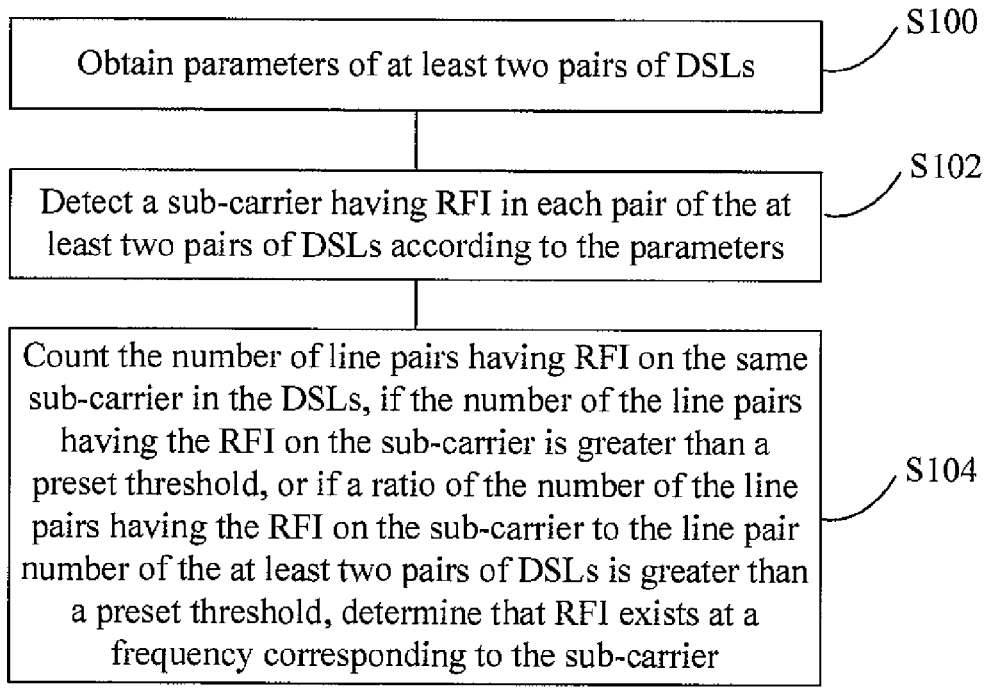
FIG. 1 is a flow chart of a method for detecting RFI according to an embodiment of the present invention.

As shown in FIG. 1, in an embodiment, the present invention provides a method for detecting RFI. The method includes the following steps:

Step S100: Acquire parameters of at least two pairs of DSLs.

Step S102: Detect sub-carriers having RFI in each pair of the at least two pairs of DSLs according to the parameters.

Step S104: Count the number of line pairs having RFI on the same sub-carrier in the DSLs. If the number of the line pairs having RFI on the sub-carrier is greater than a preset threshold, or if a ratio of the number of the line pairs having RFI on the sub-carrier to the number of line pairs of the at least two pairs of DSLs is greater than a preset threshold, it is determined that RFI exists at a frequency corresponding to the sub-carrier.

The signal-to-noise ratio of a certain sub-carrier of an xDSL is $SNR_i = PSD_{Trans} + H\log_i - PSD_{Noise}$, in which, $SNR_i$ is the signal-to-noise ratio of the sub-carrier, $PSD_{Trans}$ is the logarithm value of a transmit power spectral density of an xDSL transmitting end on this carrier, $H\log_i$ is the logarithm value of a twisted pair transfer function, and $PSD_{Noise}$ is the logarithm value of a noise power spectral density of a receiving end. When the RFI is coupled to an xDSL line, the energy of the RFI is received by an xDSL receiving end, such that the noise power spectral density $PSD_{Noise}$ received by the sub-carrier within the RFI band is increased, thus reducing the signal-to-noise ratio.

Each sub-carrier of the xDSL independently bears data. The bit number transported by a certain sub-carrier during one transmission period is calculated according to the following Shannon's formula:

$$B_i = (SNR_i - SNRM\ arg\ in_i + CodingGain - SNRGap)/(3db/bit)$$

$B_i$ is the bit number transmitted by this sub-carrier during one signal period, $SNRM\ arg\ in_i$ is a signal-to-noise ratio margin, CodingGain is the gain caused by coding, and SNR-Gap is the gap between xDSL bearer and theoretical Shannon's formula. Therefore, if the signal-to-noise ratio of a certain sub-carrier in the xDSL line is reduced, $B_i$ of the sub-carrier may thus be decreased indirectly.

Therefore, if RFI is coupled to the line, the three features of sub-carriers within the RFI band range appear: $PSD_{Noise}$ increases, $SNR_i$ decreases, and $B_i$ decreases. But the $PSD_{Noise}$, $SNR_i$ and $B_i$ of surrounding sub-carriers are not affected. Whether RFI exists in an xDSL line can be detected through one of the three features. All the parameters of $PSD_{Noise}$, $SNR_i$ and $B_i$ can be acquired on an xDSL transceiver.

In another embodiment of the present invention, in the step S100, the parameters include $PSD_{Noise}$, $SNR_i$ or $B_i$. Generally, the parameters of at least two pairs of DSLs within a range, for example, a region, are collected.

In step S102, sub-carriers having RFI in each pair of the at least two pairs of DSLs are detected according to the parameters, which can be specifically implemented through the following methods.

1. In the case that the parameter is $B_i$, i is the sub-carrier sequence number on each pair of the at least two pairs of DSLs, that is, i=1, 2, ..., m:

If the $B_i$ for the sub-carrier is less than a maximum value of the $B_i$ of more than three adjacent sub-carriers on its left side by 2 bits (or more), and is less than a maximum value of the $B_i$ of more than three adjacent sub-carriers on its right side by 2 bits (or more), it indicates that the $i^{th}$ sub-carrier of the line pair suffers RFI. For example, 5 sub-carriers exist on both the left side and the right side of the $i^{th}$ sub-carrier, if $B_i \leq \max(B_{i-1}, B_{i-2}, B_{i-3}, B_{i-4}, B_{i-5}) - 2$ and $B_i \leq \max(B_{i+1}, B_{i+2}, B_{i+3}, B_{i+4}, B_{i+5}) - 2$, it indicates that the $i^{th}$ sub-carrier of the line pair suffers RFI.

The above sub-carrier i may be a first sub-carrier.

Optionally, when the parameter is $B_i$, after the sub-carriers having RFI in each pair of the at least two pairs of DSLs are detected according to the parameters, the method further includes a step of detecting a pilot tone among the sub-carriers having RFI according to the bit number.

Generally, all pilot tones of a DSL satisfy $B_i \leq \max(B_{i-1}, B_{i-2}, B_{i-3}, B_{i-4}, B_{i-5}) - 2$ and $B_i \leq \max(B_{i+1}, B_{i+2}, B_{i+3}, B_{i+4}, B_{i+5}) - 2$, but this is not caused by RFI. Therefore, the pilot tone can be excluded from the detected RFI tones according to the characteristics of the pilot tone.

For example, if an activation mode of a DSL is ADSL Annex A, and if $B_i = 0$, and i=64, it can be determined that the $i^{th}$ tone is a pilot tone, rather than being affected by RFI.

If the activation mode of the DSL is ADSL Annex B, and if $B_i = 0$, and i=96, it can be determined that the $i^{th}$ tone is a pilot tone, rather than being affected by RFI.

If the activation mode of the DSL is ADSL2, and if $B_i = 2$, and $B_{i-1} > \max(B_k, k=1, 2, \ldots, m) - 3$, and $B_{i+1} > \max(B_k, k=1, 2, \ldots, m) - 3$, it can be determined that the $i^{th}$ tone is a pilot tone, rather than being affected by RFI.

2. In the case that the parameter is $SNR_i$, i is the sub-carrier sequence number on each pair of the at least two pairs of DSLs, for any i=1, 2, ..., m:

If $SNR_i$ for the sub-carrier is less than a maximum value of $SNR_i$ of more than three adjacent sub-carriers on its left side by 6 dB (or more), and is less than a maximum value of $SNR_i$ of more than three adjacent sub-carriers on its right side by 6 dB (or more), it indicates that the $i^{th}$ sub-carrier of the line pair suffers RFI. For example, if the $SNR_i$ of the sub-carrier is less than a maximum value of $SNR_i$ of five adjacent sub-carriers on its left side by 6 dB (or more), and is less than a maximum value of $SNR_i$ of five adjacent sub-carriers on its right side by 6 dB (or more) that is, $SNR_i \leq \max(SNR_{i-1}, SNR_{i-2}, SNR_{i-3}, SNR_{i-4}, SNR_{i-5}) - 6$, and $SNR_i \leq \max(SNR_{i+1}, SNR_{i+2}, SNR_{i+3}, SNR_{i+4}, SNR_{i+5}) - 6$, it indicates that the $i^{th}$ sub-carrier of the line pair suffers RFI.

The above sub-carrier i may be a second sub-carrier.

In addition, the parameter of $PSD_{Noise}$ can also be approximated by quiet line noise (QLN) power spectral density. The QLN is measured by an xDSL receiving end during line diagnose or line initialization.

3. In the case that the parameter is $PSD_{Noise}$, i is the sub-carrier sequence number on each pair of the at least two pairs of DSLs, for any i=1, 2, ..., m:

If $PSD_{Noise}$ for the sub-carrier is less than a maximum value of $PSD_{Noise}$ of more than three adjacent sub-carriers on its left side by 6 dBm/Hz (or more), and is less than a maximum value of $PSD_{Noise}$ of more than three adjacent sub-carriers on its right side by 6 dBm/Hz (or more), it indicates that the $i^{th}$ sub-carrier of the line pair suffers RFI. For example, if the $PSD_{Noise}$ of the sub-carrier is less than the maximum value of $PSD_{Noise}$ of five adjacent sub-carriers on its left side by 6 dBm/Hz (or more), and is less than the maximum value of $PSD_{Noise}$ of five adjacent sub-carriers on its right side by 6 dBm/Hz (or more), that is, $PSD_{Noise\_i} \geq \max(PSD_{Noise\_i-1}, PSD_{Noise\_i-2}, PSD_{Noise\_i-3}, PSD_{Noise\_i-4}, PSD_{Noise\_i-5}) - 6$ and $PSD_{Noise\_i} \geq \max(PSD_{Noise\_i+1}, PSD_{Noise\_i+2}, PSD_{Noise\_i+3}, PSD_{Noise\_i+4}, PSD_{Noise\_i+5}) - 6$, it indicates that the $i^{th}$ sub-carrier of the line pair suffers RFI.

The above sub-carrier i may be a third sub-carrier.

In step S104, if the number of line pairs is used as the preset threshold, the preset threshold is generally taken as more than 20% of the total number of line pairs selected in S100, or about 20%; and if a ratio is used as the preset threshold, the preset threshold is generally greater than 0.2 and less than 1.

In step S104, specifically, the counting the number of line pairs having RFI on the same sub-carrier in the DSLs may be exemplified as follows. If it is detected that the $i^{th}$ sub-carrier (or, sub-carrier i) of the $j^{th}$ line pair suffers RFI, RFIDetected[i][j]=1 is recorded; otherwise, RFIDetected[i][j]=0 is recorded. In this manner, a 2-D array RFIDetected[m][n] of m*n is obtained, in which m is the number of sub-carriers included in an xDSL, and n is the counted number of line pairs. The count of all line pairs having RFI on each sub-carrier (i.e., the times of the sub-carriers having RFI) is counted, that is, each row of the RFIDetected[i][j] is summed to obtain an array RFICount[m] of a length of m, the $i^{th}$ value in this array represents the times of the $i^{th}$ sub-carrier having RFI, that is, the number of the line pairs having RFI on the $i^{th}$ sub-carrier.

In this method embodiment, RFI is detected through collecting the parameters of at least two pairs of DSLs, the result of which is more comprehensive than the case that the RFI is detected by adopting one DSL pair.

In this method embodiment, after the frequency corresponding to the sub-carrier having RFI (that is, RFI frequency) is obtained, partial or all sub-carriers of the xDSL at the frequency corresponding to the sub-carrier having RFI can further be closed, so as to avoid the RFI suffered by the xDSL services. In this manner, RFI at these frequencies may not cause error in a DSL line, and may not affect the stability of the DSL line. In addition, a DSL transceiver may also reduce transmission power of the RFI frequencies, thus avoiding the interference of the DSL services to broadcasting services. For example, sub-carrier masking is used to close some xDSL sub-carriers for not being used and not bearing data. In this manner, RFI will not affect the xDSL services. In addition, a DSL transceiver may also reduce transmission power of the RFI frequencies, thus avoiding the interference of the DSL services to broadcasting services.

Figure 2:
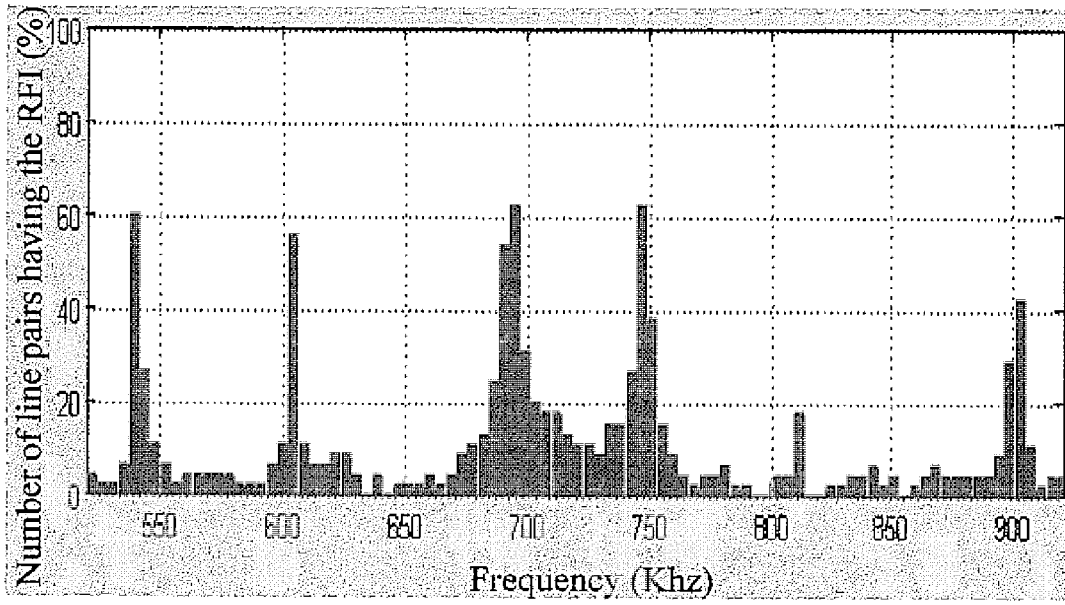
FIG. 2 is an effect drawing of detecting RFI by utilizing the method according to the embodiment of the present invention.

Specific examples are taken below to illustrate the method described in the embodiments of the present invention. The parameter of $B_i$ for 45 ADSL pairs are collected in a certain region in Xi'an, and RFI is detected by utilizing the method provided in the embodiments of the present invention, the result is as shown in FIG. 2. All together, five frequency bands exist at which the ratio of the number of line pairs having RFI to the detected ADSL number of line pairs is greater than 40%, and the sequence numbers of the sub-carriers where their peaks locate are 125, 140, 161, 173 and 209 respectively. By multiplying the sub-carrier sequence number with a sub-carrier frequency interval, for example, 4.3125 kHz, the frequencies corresponding to the five sub-carriers can be obtained, which are 539 kHz, 604 kHz, 694 kHz, 746 kHz and 901 kHz respectively. The broadcasting stations in Xi'an corresponding to the five frequencies are respectively voice of China, 540 KHz; Shanxi cities, 603 KHz; Shanxi news, 693 KHz; Shanxi dramas, 747 KHz; and Shanxi countries, 900 KHz.

It can be seen that, the RFI frequencies detected by utilizing the method provided in the embodiments of the present invention perfectly coincide with broadcasting stations' actual RFI transmit power. In addition, the RFI count diagram also reflects the effect of RFI on the frequencies corresponding to various sub-carriers. In FIG. 2, among the five frequencies having RFI, the count corresponding to 694 KHz is the largest, which represents that the number of line pairs having RFI at the frequency band is the largest, that is, users having RFI are the most. Moreover, the number of the sub-carriers affected by the RFI is also the largest, which represents that the frequency band for this broadcasting station affected by RFI is the broadest.

Figure 3:
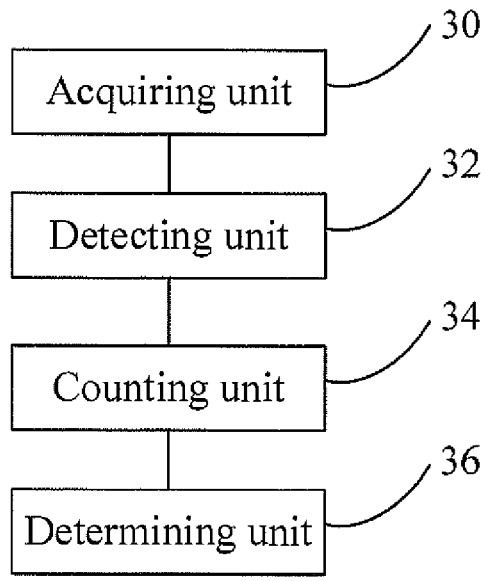
FIG. 3 is a structural view of a device for detecting RFI according to an embodiment of the present invention.

As shown in FIG. 3, in an embodiment, the present invention further provides a detecting device. The device includes an acquiring unit 30, a detecting unit 32, a counting unit 34, and a determining unit 36.

The acquiring unit 30 is configured to acquire parameters of at least two pairs of DSLs. The detecting unit 32 is configured to detect sub-carriers having RFI in each pair of the at least two pairs of DSLs according to the parameters. The counting unit 34 is configured to count the number of line pairs having RFI on the same sub-carrier in the DSLs. The determining unit 36 is configured to determined whether the number of line pairs counted by the counting unit 34 is greater than a preset threshold, or whether a ratio of the number of line pairs counted by the counting unit 34 to the number of line pairs of the at least two pairs of DSLs is greater than a preset threshold, and if so, the detecting unit determines that RFI exists at a frequency corresponding to the sub-carrier.

Optionally, the detecting device further includes a configuring unit 37, configured to, according to the frequency corresponding to the sub-carrier having RFI (that is, the RFI frequency) obtained by the determining unit 36, close partial or all sub-carriers of an xDSL at the RFI frequency. In this manner, the RFI suffered by xDSL services is avoided.

Optionally, the detecting device further includes a displaying unit 38, which is connected with the counting unit 34, and configured to display the number of line pairs having RFI on the same sub-carrier. In this manner, users or operators can be enabled to visually see the frequency bands having RFI, and which RFIs affect more seriously.

Optionally, the detecting unit 32 may further include a first detecting unit 320, and/or a second detecting unit 322, and/or a third detecting unit 324.

The first detecting unit 320 is configured to detect that a first sub-carrier of each pair of the at least two pairs of DSLs is the sub-carrier having RFI if a bit number of the first sub-carrier is less than a maximum bit number among the bit numbers of more than three adjacent sub-carriers on its left side by 2 bits or more, and is less than a maximum bit number among the bit numbers of more than three adjacent sub-carriers on its right side by 2 bits or more when the parameter is the bit number of a line pair.

The second detecting unit 322 is configured to detect that a second sub-carrier of each pair of the at least two pairs of DSLs is the sub-carrier having RFI if a signal-to-noise ratio of the second sub-carrier is less than a maximum ratio among the signal-to-noise ratios of more than three adjacent sub-carriers on its left side by 6 dB or more, and is less than a maximum ratio among the signal-to-noise ratios of more than three adjacent sub-carriers on its right side by 6 dB or more when the parameter is the signal-to-noise ratio of the line pair.

The third detecting unit 324 is configured to detect that a third sub-carrier of each pair of the at least two pairs of DSLs is the sub-carrier having RFI if a noise power spectral density of the third sub-carrier is less than a maximum density among the noise power spectral densities of more than three adjacent sub-carriers on its left side by 6 dBm/Hz or more, and is less than a maximum density among the noise power spectral densities of more than three adjacent sub-carriers on its right side by 6 dBm/Hz or more when the parameter is the noise power spectral density of the line pair.

If the detecting unit 32 includes the first detecting unit 320, optionally, the detecting unit may further include a fourth detecting unit 326. The fourth detecting unit 326 is configured to detect a pilot tone from the sub-carriers having RFI detected by the first detecting unit 320 according to the bit number of the line pair. Specifically, if a sub-carrier is a pilot tone, the sub-carrier is not the sub-carrier having RFI.

Figure 4:
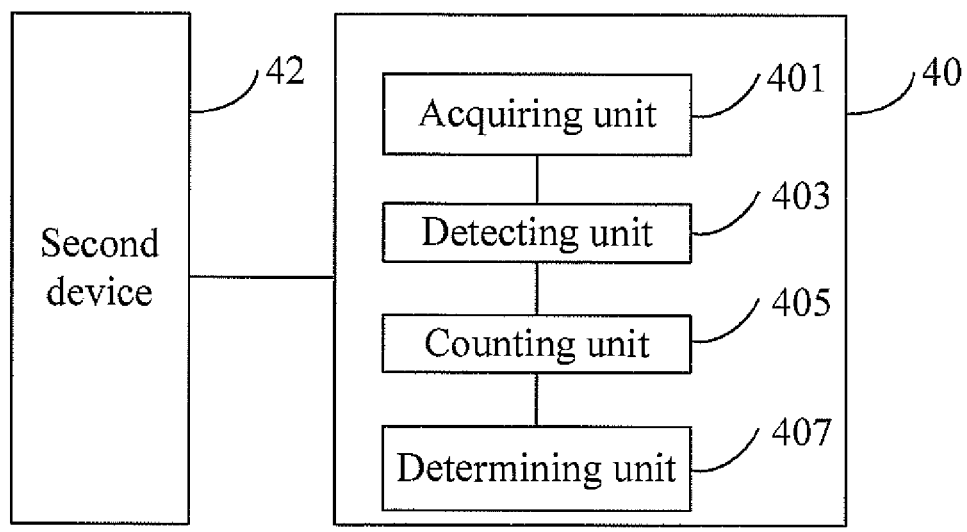
FIG. 4 is a diagram showing a DSL system according to an embodiment of the present invention.

As shown in FIG. 4, in an embodiment, the present invention further provides a DSL system. The system includes a first device 40 and a second device 42.

The first device 40 includes an acquiring unit 401, a detecting unit 403, a counting unit 405, and a determining unit 407. The acquiring unit 401 is configured to acquire parameters of at least two pairs of DSLs from the second device. The detecting unit 403 is configured to detect sub-carriers having RFI in each pair of the at least two pairs of DSLs according to the parameters. The counting unit 405 is configured to count the number of line pairs having RFI on the same sub-carrier in the DSLs. The determining unit 407 is configured to determined whether the number of line pairs counted by the counting unit 405 is greater than a preset threshold, or whether a ratio of the number of line pairs counted by the counting unit to the number of line pairs of the at least two pairs of DSLs is greater than a preset threshold, and if so, the detecting unit determines that RFI exists at a frequency corresponding to the sub-carrier.

Optionally, the detecting device further includes a displaying unit 409, which is connected with the counting unit 405, and configured to display the number of line pairs having RFI on the same sub-carrier. In this manner, users or operators can be enabled to visually see the frequency bands existing RFI, and which RFIs affect more seriously. Optionally, if the detecting device includes the displaying unit 409, it may not include the determining unit 407.

Optionally, the detecting unit 403 may further include a first detecting unit, and/or a second detecting unit, and/or a third detecting unit.

The first detecting unit is configured to detect that a first sub-carrier of each pair of the at least two pairs of DSLs is the sub-carrier having RFI if a bit number of the first sub-carrier is less than a maximum bit number among the bit numbers of more than three adjacent sub-carriers on its left side by 2 bits or more, and is less than a maximum bit number among the bit numbers of more than three adjacent sub-carriers on its right side by 2 bits or more when the parameter is the bit number of a line pair.

The second detecting unit is configured to detect that a second sub-carrier of each pair of the at least two pairs of DSLs is the sub-carrier having RFI if a signal-to-noise ratio of the second sub-carrier is less than a maximum ratio among the signal-to-noise ratios of more than three adjacent sub-carriers on its left side by 6 dB or more, and is less than a maximum ratio among the signal-to-noise ratios of more than three adjacent sub-carriers on its right side by 6 dB or more when the parameter is the signal-to-noise ratio of the line pair.

The third detecting unit is configured to detect that a third sub-carrier of each pair of the at least two pairs of DSLs is the sub-carrier having RFI if a noise power spectral density of the third sub-carrier is less than a maximum density among the noise power spectral densities of more than three adjacent sub-carriers on its left side by 6 dBm/Hz or more, and is less than a maximum density among the noise power spectral densities of more than three adjacent sub-carriers on its right side by 6 dBm/Hz or more when the parameter is the noise power spectral density of the line pair.

Optionally, the first device may further includes a configuring unit 411, which is configured to decide to close partial or all sub-carriers of an xDSL at a frequency corresponding to the sub-carriers having RFI (that is, the RFI frequency) obtained from the determining unit 407 according to the RFI frequency, and transmit information of the partial or all sub-carriers to the second device. The information includes, but not limited to, the sequence numbers of the sub-carriers. The second device is configured to close the partial or all sub-carriers according to the information of the partial or all sub-carriers transmitted by the first device. In this manner, the RFI suffered by xDSL services is avoided.

In the DSL system provided in the embodiments of the present invention, the first device may be a line management system, and the second device may be a DSL access multiplexer (DSLAM). The line management system can acquire the parameters of the at least two pairs of DSLs from the DSLAM through simple network management protocol (SNMP) or file transfer protocol (FTP).

The line management system can also acquire the parameters of the at least two pairs of DSLs from the DSLAM through a network management system. The network management system may interact with the DSLAM and manage the DSLAM through a Q interface by utilizing SNMP.

Person having ordinary skill in the art may understand that all or part of the steps of the method according to the embodiments of the present invention may be implemented by a program instructing relevant hardware. The program may be stored in a computer readable storage medium.

The storage medium may be a Read-Only Memory (ROM), a magnetic disk, or a Compact Disk Read-Only Memory (CD-ROM).

It should be noted that the above embodiments are merely provided for elaborating the technical solutions of the present invention, but not intended to limit the present invention. Although the present invention has been described in detail with reference to the foregoing embodiments, it is apparent that person having ordinary skill in the art can make various modifications or equivalent replacements to the technical solutions of the invention without departing from the spirit and scope of the invention. Any modification, equivalent replacement, or improvement made without departing from the spirit and principle of the present invention should fall within the scope of the present invention.

What is claimed is:

1. A method for detecting radio frequency interference (RFI), the method comprising:
   acquiring parameters of at least two pairs of digital subscriber lines (DSLs);
   detecting sub-carriers having RFI in each pair of the at least two pairs of DSLs according to the parameters; and
   counting the number of line pairs having RFI on the same sub-carrier in the DSLs, wherein if the number of the line pairs having RFI on the sub-carrier is greater than a preset threshold, or if a ratio of the number of the line pairs having RFI on the sub-carrier to the number of line pairs of the at least two pairs of DSLs is greater than a preset threshold, it is determined that RFI exists at a frequency corresponding to the sub-carrier.

2. The method for detecting RFI according to claim 1, wherein if the parameter is a bit number, the detecting the sub-carriers having RFI in each pair of the at least two pairs of DSLs according to the parameters specifically comprises:
   detecting that a first sub-carrier of each pair of the at least two pairs of DSLs is the sub-carrier having RFI, if the bit number of the first sub-carrier is less than a maximum bit number among the bit numbers of more than three adjacent sub-carriers on its left side by 2 bits or more, and is less than a maximum bit number among the bit numbers of more than three adjacent sub-carriers on its right side by 2 bits or more.

3. The method for detecting RFI according to claim 1, wherein if the parameter is the bit number, after the detecting the sub-carriers having RFI in each pair of the at least two pairs of DSLs according to the parameters, the method further comprises:

detecting a pilot tone among the sub-carriers having RFI according to the bit numbers.

4. The method for detecting RFI according to claim 1, wherein if the parameter is a signal-to-noise ratio, the detecting the sub-carrier having RFI in each pair of the at least two pairs of DSLs according to the parameters specifically comprises:

detecting that a second sub-carrier of each pair of the at least two pairs of DSLs is the sub-carrier having RFI, if the signal-to-noise ratio of the second sub-carrier is less than a maximum ratio among the signal-to-noise ratios of more than three adjacent sub-carriers on its left side by 6 dB or more, and is less than a maximum ratio among the signal-to-noise ratios of more than three adjacent sub-carriers on its right side by 6 dB or more.

5. The method for detecting RFI according to claim 1, wherein if the parameter is a noise power spectral density, the detecting the sub-carrier having RFI in each pair of the at least two pairs of DSLs according to the parameters specifically comprises:

detecting that a third sub-carrier of each pair of the at least two pairs of DSLs is the sub-carrier having RFI, if the noise power spectral density of the third sub-carrier is less than a maximum density among the noise power spectral densities of more than three adjacent sub-carriers on its left side by 6 dBm/Hz or more, and is less than a maximum density among the noise power spectral densities of more than three adjacent sub-carriers on its right side by 6 dBm/Hz or more.

6. The method for detecting RFI according to claim 1, further comprising: closing partial or all sub-carriers at the acquired frequency corresponding to the sub-carrier having RFI according to the frequency.

7. A detecting device, comprising an acquiring unit, a detecting unit, a counting unit, and a determining unit, wherein the acquiring unit is configured to acquire parameters of at least two pairs of digital subscriber lines (DSLs);
  the detecting unit is configured to detect sub-carriers having RFI in each pair of the at least two pairs of DSLs according to the parameters;
  the counting unit is configured to count the number of line pairs having RFI on the same sub-carrier; and
  the determining unit is configured to determine whether the number of line pairs counted by the counting unit is greater than a preset threshold, or whether a ratio of the number of line pairs counted by the counting unit to the number of line pairs of the at least two pairs of DSLs is greater than a preset threshold, and if the number of line pairs counted by the counting unit is greater than a preset threshold or the ratio of the number of line pairs counted by the counting unit to the number of line pairs of the at least two pairs of DSLs is greater than a preset threshold, determine that RFI exists at a frequency corresponding to the sub-carrier.

8. The detecting device according to claim 7, further comprising a configuring unit, configured to close partial or all sub-carriers at a frequency corresponding to the sub-carrier having RFI obtained by the determining unit according to the frequency.

9. The detecting device according to claim 7, wherein the detecting unit comprises a first detecting unit, and/or a second detecting unit, and/or a third detecting unit, the first detecting unit is configured to detect that a first sub-carrier of each pair of the at least two pairs of DSLs is the sub-carrier having RFI if a bit number of the first sub-carrier is less than a maximum bit number among the bit numbers of more than three adjacent sub-carriers on its left side by 2 bits or more, and is less than a maximum bit number among the bit numbers of more than three adjacent sub-carriers on its right side by 2 bits or more when the parameter is the bit number of a line pair;
  the second detecting unit is configured detect that a second sub-carrier of each pair of the at least two pairs of DSLs is the sub-carrier having RFI if a signal-to-noise ratio of the second sub-carrier is less than a maximum ratio among the signal-to-noise ratios of more than three adjacent sub-carriers on its left side by 6 dB or more, and is less than a maximum ratio among the signal-to-noise ratios of more than three adjacent sub-carriers on its right side by 6 dB or more when the parameter is the signal-to-noise ratio of the line pair; and
  the third detecting unit is configured to detect that a third sub-carrier of each pair of the at least two pairs of DSLs is the sub-carrier having RFI if a noise power spectral density of the third sub-carrier is less than a maximum density among the noise power spectral densities of more than three adjacent sub-carriers on its left side by 6 dBm/Hz or more, and is less than a maximum density among the noise power spectral densities of more than three adjacent sub-carriers on its right side by 6 dBm/Hz or more when the parameter is the noise power spectral density of the line pair.

10. A digital subscriber line (DSL) system, comprising a first device and a second device, the first device includes an acquiring unit, a detecting unit, a counting unit, and a determining unit, wherein the acquiring unit is configured to acquire parameters of at least two pairs of digital subscriber lines from the second device;

the detecting unit is configured to detect sub-carriers having RFI in each pair of the at least two pairs of DSLs according to the parameters;
  the counting unit is configured to count the number of line pairs having RFI on the same sub-carrier in the DSLs; and
  the determining unit is configured to determine whether the number of line pairs counted by the counting unit is greater than a preset threshold, or whether a ratio of the number of line pairs counted by the counting unit to the number of line pairs of the at least two pairs of DSLs is greater than a preset threshold, and if the number of line pairs counted by the counting unit is greater than a preset threshold or the ratio of the number of line pairs counted by the counting unit to the number of line pairs of the at least two pairs of DSLs is greater than a preset threshold, determine that RFI exists at a frequency corresponding to the sub-carrier.

11. The DSL system according to claim 10, wherein the detecting unit comprises a first detecting unit, and/or a second detecting unit, and/or a third detecting unit, the first detecting unit is configured to detect that a first sub-carrier of each pair of the at least two pairs of DSLs is the sub-carrier having RFI if a bit number of the first sub-carrier is less than a maximum bit number among the bit numbers of more than three adjacent sub-carriers on its left side by 2 bits or more, and is less than a maximum bit number among the bit numbers of more than three adjacent sub-carriers on its right side by 2 bits or more when the parameter is the bit number of a line pair;

the second detecting unit is configured to detect that a second sub-carrier of each pair of the at least two pairs of DSLs is the sub-carrier having RFI if a signal-to-noise ratio of the second sub-carrier is less than a maximum ratio among the signal-to-noise ratios of more than three adjacent sub-carriers on its left side by 6 dB or more, and is less than a maximum ratio among the signal-to-noise ratios of more than three adjacent sub-carriers on its right side by 6 dB or more when the parameter is the signal-to-noise ratio of the line pair; and the third detecting unit is configured to detect that a third sub-carrier of each pair of the at least two pairs of DSLs is the sub-carrier having RFI if a noise power spectral density of the third sub-carrier is less than a maximum density among the noise power spectral densities of more than three adjacent sub-carriers on its left side by 6 dBm/Hz or more, and is less than a maximum density among the noise power spectral densities of more than three adjacent sub-carriers on its right side by 6 dBm/Hz or more when the parameter is the noise power spectral density of the line pair.

12. The DSL system according to claim 10, wherein the first device further comprises a configuring unit, configured to decide to close partial or all sub-carriers at a frequency corresponding to the sub-carrier having RFI obtained from the determining unit according to the RFI frequency, and transmit information of the partial or all sub-carriers to the second device.

13. The DSL system according to claim 12, wherein the second device is further configured to close the partial or all sub-carriers according to the information of the partial or all sub-carriers transmitted by the first device.

* * * * *